July 1, 1969     A. L. REMACLE     3,452,521
AIR FILTER WITH SUPPLEMENTAL AIR INLET
Filed May 5, 1967                    Sheet 1 of 2

INVENTOR.
Aloys L. Remacle
BY Warren, Milmore,
Cypher, Rubin & Brucker
Attorneys INVENTOR.
Aloys L. Remacle
BY Warren, Milmore,
Cypher, Rubin & Brucker
Attorneys United States Patent Office 3,452,521
Patented July 1, 1969

3,452,521
AIR FILTER WITH SUPPLEMENTAL AIR INLET
Aloys L. Remacle, 616 Bonnie St.,
El Cerrito, Calif. 92243
Filed May 5, 1967, Ser. No. 636,524
Int. Cl. B01d *51/00*
U.S. Cl. 55—419       1 Claim

ABSTRACT OF THE DISCLOSURE

An air filter for an automotive internal combustion engine having a filter element mounted within a casing to provide an air chamber to which fresh air is suplied, is constructed to admit a controlled flow of supplemental air to said chamber through an auxiliary inlet having a valve the position of which is adjustable, as from the driver's compartment. This permits a greater flow of air to the carburetor at high speeds.

---

The invention relates to air filters for automotive internal combustion engines, which are mounted to remove dust and other foreign matter from the fresh air supplied to the carburetor. More particularly, it pertains to an improved air filter having provision for supplying additional air to the filter element at the control of an operator, e.g., when the engine is operated at high speed.

At high-speed engine operation there is an increased flow of air through the filter or air cleaner into the carburetor, resulting in an increased pressure drop through the filter. Thus, the air filter becomes increasingly restrictive as the air flow increases, with the results that the carburetted mixture suplied to the engine becomes richer, leading to inefficient operation of the engine and an over use of fuel. This is especially marked when an automobile is operated at a speed above about 60 miles per hour.

The usual air filters in contemporary use include a closed casing of circular outline which contains a filter element, such as one made of filter paper which is folded to provide a large flow area. The filter element is mounted in relation to the casing wall to provide an elongated air-supply passage from which air can flow to all parts of the filter element. In a specific construction, the element is annular and the air-supply passage is also annular, being situated outside of the element; the clean-air outlet is then situated centrally to receive filtered air from the circular space within the element. Fresh air is admitted to the air-supply passage through a suitable inlet, which usually includes a tube for regulating the influx of air into the air-supply passage.

Attempts have been made to increase the influx of fresh air by enlarging the inlet and/or removing the tube. However, this has resulted in faulty operation of the engine, in that insufficient flow resistance to the air was presented at low air flow, which occur at low engine speeds; this resulted in overly lean mixtures, causing reduced power.

The difficulties noted in the two preceding paragraphs are occasioned by the fact that the air supply system in an automobile, including the passage to the carburetor, are designed to produce a desired fuel-air mixture at standard driving speeds, below about 60 miles per hour. In practical operation, despite complex devices sometimes includin carburetors, it is not feasible to produce a fuel-air mixture of desired composition at all operating speeds.

Now according to the invention the difficulty is overcome by providing the air filter with an auxiliary fresh-air inlet which is controlled by an adjustable flow-control means, such as a slide valve operable from the driver's compartment, for admitting suplemental air to the air-supply passage of the filter. The vehicle operator can open the auxiliary inlet to admit supplemental air when the automobile is operated at high speed and shut it when it is operated at standard, i.e., lower speeds.

Advantageously, the auxiliary air inlet is controlled by a valve that can be easily positioned and will maintain a selected position, namely, a slide valve.

In operation, it was found that the auxiliary air inlet can effect an economy of two or more miles per gallon at speeds in excess of 60 miles per hour, compared to operation at the same high speed with the auxiliary inlet closed. Conversely, it was found that operation of the automobile at low speeds, such as 15 to 30 miles per hour, with the auxiliary inlet fully open resulted in a significant loss of power.

The invention will be further described with reference to the accompanying drawings showing one illustrative example, wherein.

Figure 1:
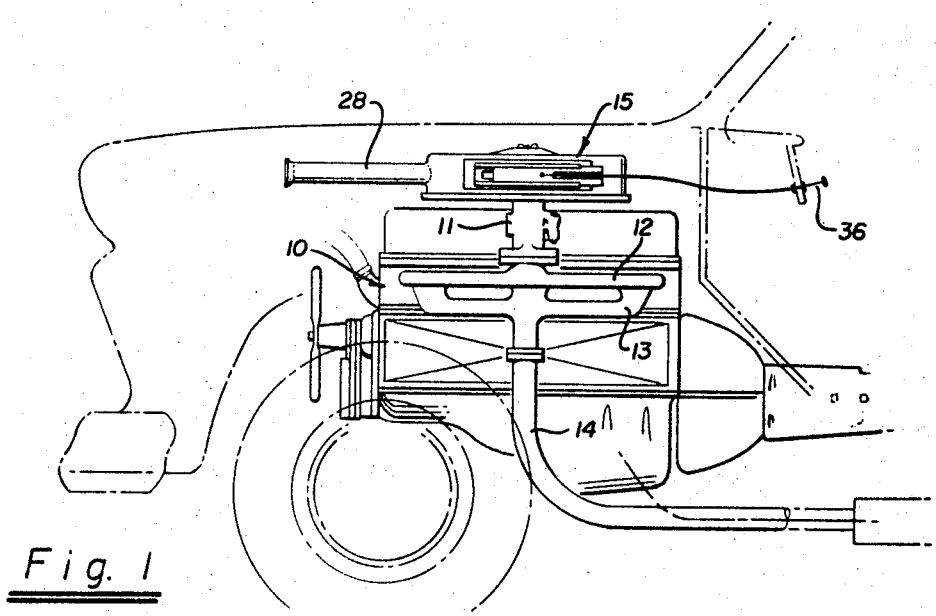
FIGURE 1 is an elevation of an automotive engine provided with an air filter according to the invention, parts of the automobile appearing in phantom.
Figure 2:
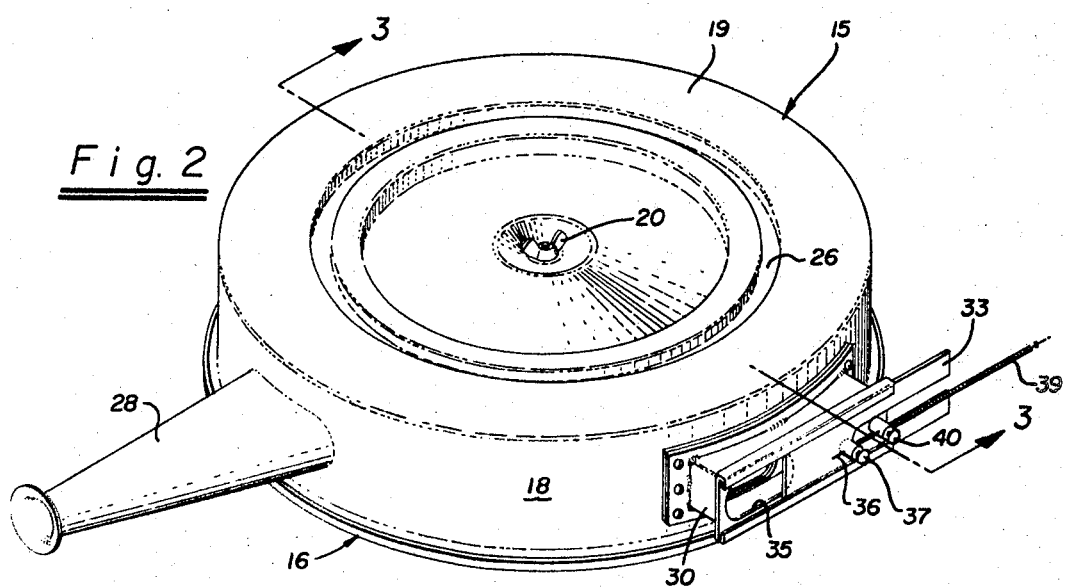
FIGURE 2 is a pictorial view of the filter.
Figure 3:
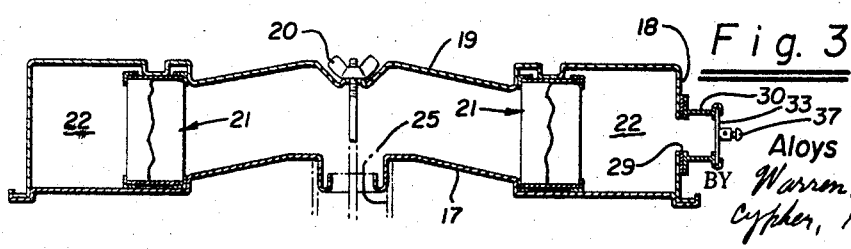
FIGURE 3 is a section taken on the line 3—3 of FIGURE 2.
Figure 4:
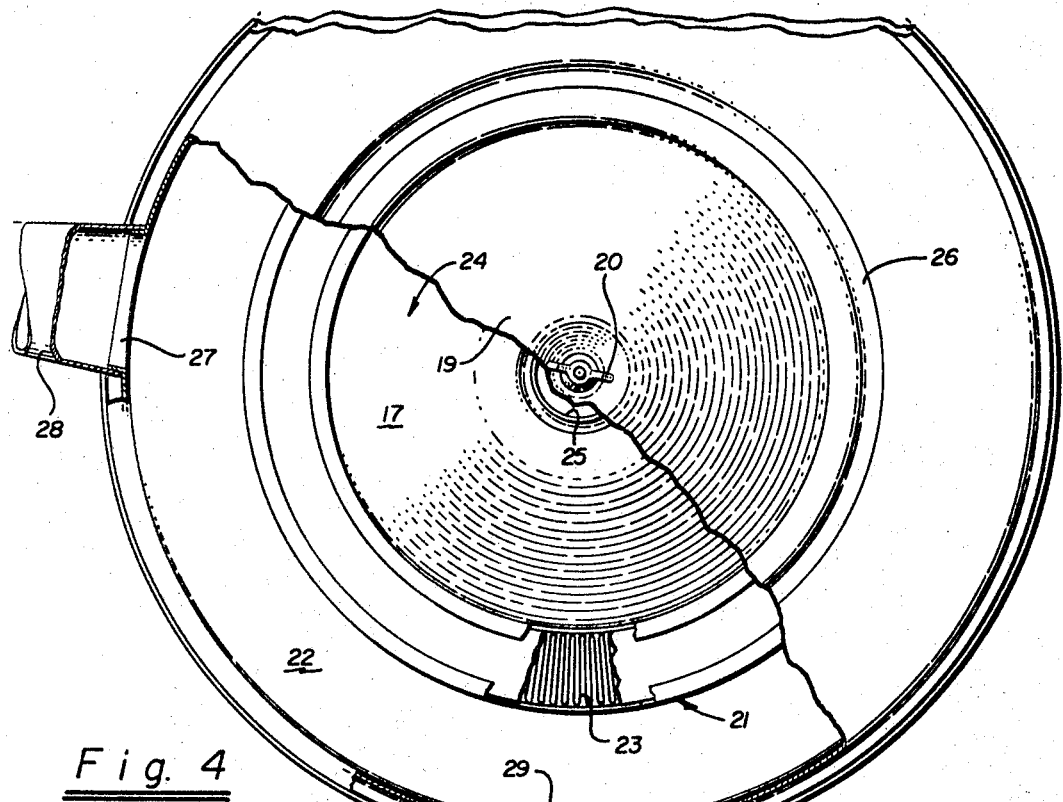
FIGURE 4 is a plan of the filter, shown on an enlarged scale, parts being broken away or shown in section.
Figure 5:
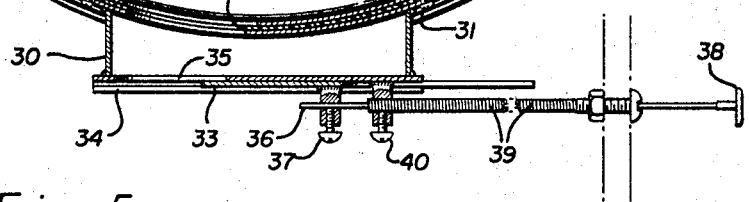
FIGURE 5 is a fragmentary elevation of the filter, looking toward the auxiliary air inlet.
Figure 6:
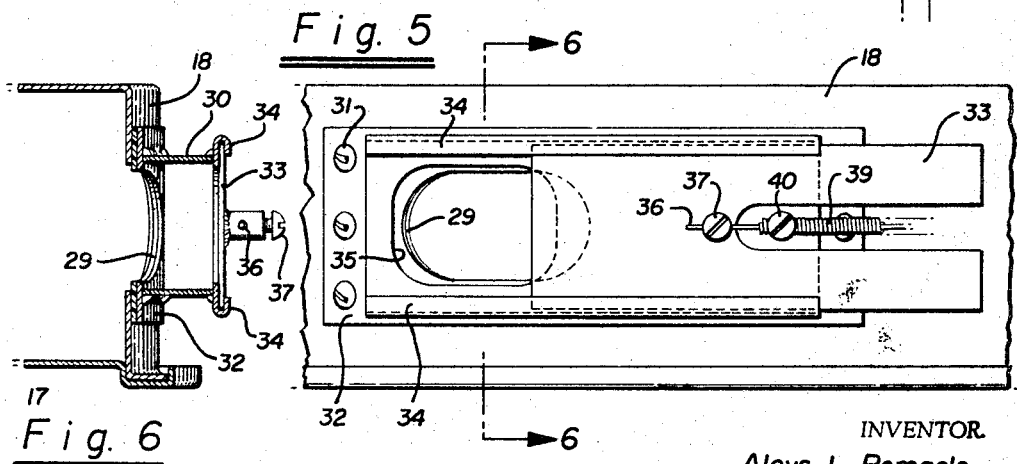
FIGURE 6 is a section taken on the line 6—6 of FIGURE 5.

In the drawings, FIGURE 1 shows an internal combustion engine 10 having a carburetor 11 of the downflow type discharging into an intake manifold 12. The engine further has an exhaust manifold 13 and exhaust pipe 14. Air is supplied to the carburetor through an air filter or air cleaner 15 constructed according to the invention.

As appears in the several views, the air cleaner includes a casing having a lower section 16, formed of a circular bottom wall 17 and an annular, vertical side wall 18, and a cover 19 which is removable and is secured by a bolt and wing nut 20. The casing contains an annular filter element 21 having an outer diameter less than that of the wall 18 to provide an annular air-supply passage 22. The filter may be of any type, e.g., of paper folded many times as appears at 23 to provide an extended area for the flow of air from the passage 22 in a generally radially inward direction into the circular clean-air space 24. The bottom wall 17 has at its center a clean-air outlet opening 25 which is connected to the carburetor 11. The casing is provided with suitable means for positioning the filter element, e.g., including an annular downward projection 26 formed in the cover 19 and the filter element is sealed against the walls 17 and 19 so that the only communication between the passage 22 and the space 24 is through the filter element. Although the air flow through the filter element is generally radial, it follows a tortuous path in flowing through the filter paper. The casing has a fresh-air inlet (herein called the principal fresh-air inlet) including an opening 27 formed in the annular side wall 18 and a tube 28 extending outwardly from said wall. The parts described up to this point are known.

Supplemental fresh air is admitted to the passage 22 through an auxiliary air inlet which comprises: an opening 29 formed in the wall 18 in circularly displaced relation to the opening 27; an auxiliary air intake chamber 30 having confining walls and attached to the casing wall 18 by screws or rivets 31, the auxiliary chamber having advantageously an arcuately curved plate 32 by which it can be engaged in sealed relation to the wall 18 about the opening 27; and a slide plate 33 which is secured by retaining flanges 34 at the outer side of the chamber for movement in front of an outer air inlet opening 35 formed in the outer chamber wall. The slide plate 33 forms a slide valve whereby the degree of opening of the opening 35 can be adjusted, and when this plate is positioned in its extreme position, fully covering the opening, no supplemental air can enter the casing 16.

For controlling the position of the slide plate 33 from within the driver's compartment a control rod or wire 36 is connected to the plate by a screw 37 which clamps the wire within a boss fixed to the plate. This wire extends to the driver's compartment, where it has a head or knob 38. When wire is used the wire 36 is enclosed in a tubular cable 39, such as one made of helically coiled wire, the end of which is secured to the outer wall of the chamber 30 by a screw 40, which clamps the tubular cable within a boss fixed to the stationary chamber.

In operation, when the automobile is operated at standard speeds, the knob 38 is pushed in, thereby moving the plate 33 to cover the opening 35. Only the normal amount of air, determined by the flow resistance of the tube 28 and the filter element 21, then reaches the carburetor. When the automobile is operated at high speed, the knob 38 is pulled out fully or partly, thereby uncovering the opening 35 a corresponding amount and admitting supplemental air through this opening into the passage 22 to comingle with the principal air stream admitted from the tube 28. This mixture flows through the passage 22 and flows in a generally radially inward direction through the filter element into the inner space 24 and thence via the central clean-air outlet opening 25 to the carburetor 11.

The effectiveness of the auxiliary air inlet opening is influenced by the cleanliness of the filter element 21. When it is laden with dust and other foreign matter a greater pressure drop is generated across the filter element, causing reduced air flow.

I claim:

1. An air filter for internal combustion engines comprising, a casing having top and bottom walls and a circular circumferentially extending outer wall defining an internal chamber, an annular radial-flow air filter element mounted concentrically in said chamber and engaging between said top and bottom walls and being spaced inwardly from said outer wall to define an annular air intake passage, said bottom wall being formed with an air outlet opening internally of said filter element whereby air flowing from said intake passage to said outlet opening will be required to flow through said filter element, said outer wall being formed with a first air inlet opening communicating with said annular air intake passage, an air inlet tube secured at one end to said outer wall in registration with said first opening and having its opposite end open to the atmosphere to provide a predetermined fixed regulation of air flow into said intake passage, said outer wall being formed with a second air inlet opening spaced from said first opening and communicating with said annular air intake passage, and a manually operable valve secured to said last named wall in registration with said second opening for manually regulating the air flow therethrough, said valve comprising an arcuately curved mounting plate secured to the exterior side of said outer wall and having an air passage therein registering with said second inlet opening and a slide valve member mounted for reciprocation on said plate relative the air passage for regulating the air flow therethrough.

References Cited

UNITED STATES PATENTS

| | | | |
|---|---|---|---|
| 1,123,108 | 12/1914 | Davidson | 251—319 |
| 2,153,350 | 4/1939 | Stimac | 55—419 |
| 2,657,705 | 11/1953 | Gerhard et al. | 251—294 |
| 2,764,393 | 9/1956 | Geyer | 251—294 |
| 2,766,845 | 10/1956 | Raymond | 55—312 |
| 2,788,086 | 4/1957 | Sebok | 55—419 |
| 2,893,419 | 7/1959 | Coulter | 251—294 |
| 3,039,254 | 6/1962 | Thornburgh | 55—276 |
| 3,102,800 | 9/1963 | Bora | 55—467 |
| 3,115,873 | 12/1963 | Hahn et al. | 55—510 |

FOREIGN PATENTS

| | | |
|---|---|---|
| 605,556 | 9/1960 | Canada. |

HARRY B. THORNTON, *Primary Examiner.*

B. NOZICK, *Assistant Examiner.*

U.S. Cl. X.R.

55—510; 251—319